United States Patent
Ochi et al.

(10) Patent No.: US 10,757,923 B2
(45) Date of Patent: Sep. 1, 2020

(54) AQUACULTURE SYSTEM

(71) Applicants: NIKKISO CO., LTD., Tokyo (JP); KENSUI CO., LTD., Hiroshima (JP)

(72) Inventors: Tetsumi Ochi, Tokyo (JP); Ken Kawasaki, Hiroshima (JP)

(73) Assignees: NIKKISO CO., LTD., Tokyo (JP); KENSUI CO., LTD., Hiroshima (JP)

( * ) Notice: Subject to any disclaimer, the term of this patent is extended or adjusted under 35 U.S.C. 154(b) by 193 days.

(21) Appl. No.: 16/106,255

(22) Filed: Aug. 21, 2018

(65) Prior Publication Data
US 2019/0053471 A1   Feb. 21, 2019

(30) Foreign Application Priority Data

Aug. 21, 2017  (JP) .................................. 2017-158860

(51) Int. Cl.
| | |
|---|---|
| *A01K 61/00* | (2017.01) |
| *A01K 61/54* | (2017.01) |
| *C02F 1/32* | (2006.01) |
| *A01K 63/04* | (2006.01) |
| *A01K 63/06* | (2006.01) |
| *C02F 103/20* | (2006.01) |
| *C02F 103/08* | (2006.01) |

(52) U.S. Cl.
CPC ............. *A01K 61/54* (2017.01); *A01K 63/04* (2013.01); *A01K 63/042* (2013.01); *A01K 63/06* (2013.01); *C02F 1/325* (2013.01); *C02F 2103/08* (2013.01); *C02F 2103/20* (2013.01); *C02F 2201/3222* (2013.01); *C02F 2201/3228* (2013.01); *C02F 2303/04* (2013.01)

(58) Field of Classification Search
CPC ........ A01K 61/00; A01K 61/10; A01K 63/00; A01K 63/02; A01K 63/04; A01K 63/042; A01K 61/54
USPC ....... 119/200, 201, 204, 205, 206, 213, 215, 119/216, 217, 219, 234
See application file for complete search history.

(56) References Cited

U.S. PATENT DOCUMENTS

| | | | | |
|---|---|---|---|---|
| 6,793,440 | B2 * | 9/2004 | Nestler | E02B 8/085 405/81 |
| 6,918,354 | B2 * | 7/2005 | Perriello | A01K 63/04 119/231 |
| 8,950,361 | B1 * | 2/2015 | Pierce | A01K 63/042 119/200 |

(Continued)

FOREIGN PATENT DOCUMENTS

JP    2014-018099 A    2/2014

*Primary Examiner* — Richard T Price, Jr.
(74) *Attorney, Agent, or Firm* — Scully, Scott, Murphy & Presser, PC

(57) ABSTRACT

Provided is an aquaculture system, including a water tank holding seawater and housing shellfish or fish to be cultivated, a water intake unit for introducing the seawater into the water tank, a draining unit for draining the seawater in the water tank, a first bubble generator that generates and supplies microbubbles with a diameter of not less than 10 μm and not more than 100 μm in the water tank, and a second bubble generator that generates and supplies nanobubbles with a diameter of not more than 10 μm in the water tank, wherein the seawater in the water tank is exchanged by simultaneously carrying out introduction of the seawater using the water intake unit and drainage of the seawater in the water tank using the draining unit.

9 Claims, 3 Drawing Sheets

(56) References Cited

U.S. PATENT DOCUMENTS 9,845,255 B2 * 12/2017 Lo ............................. C02F 3/02
10,342,189 B2 * 7/2019 Gencer ................. A01G 33/00

* cited by examiner

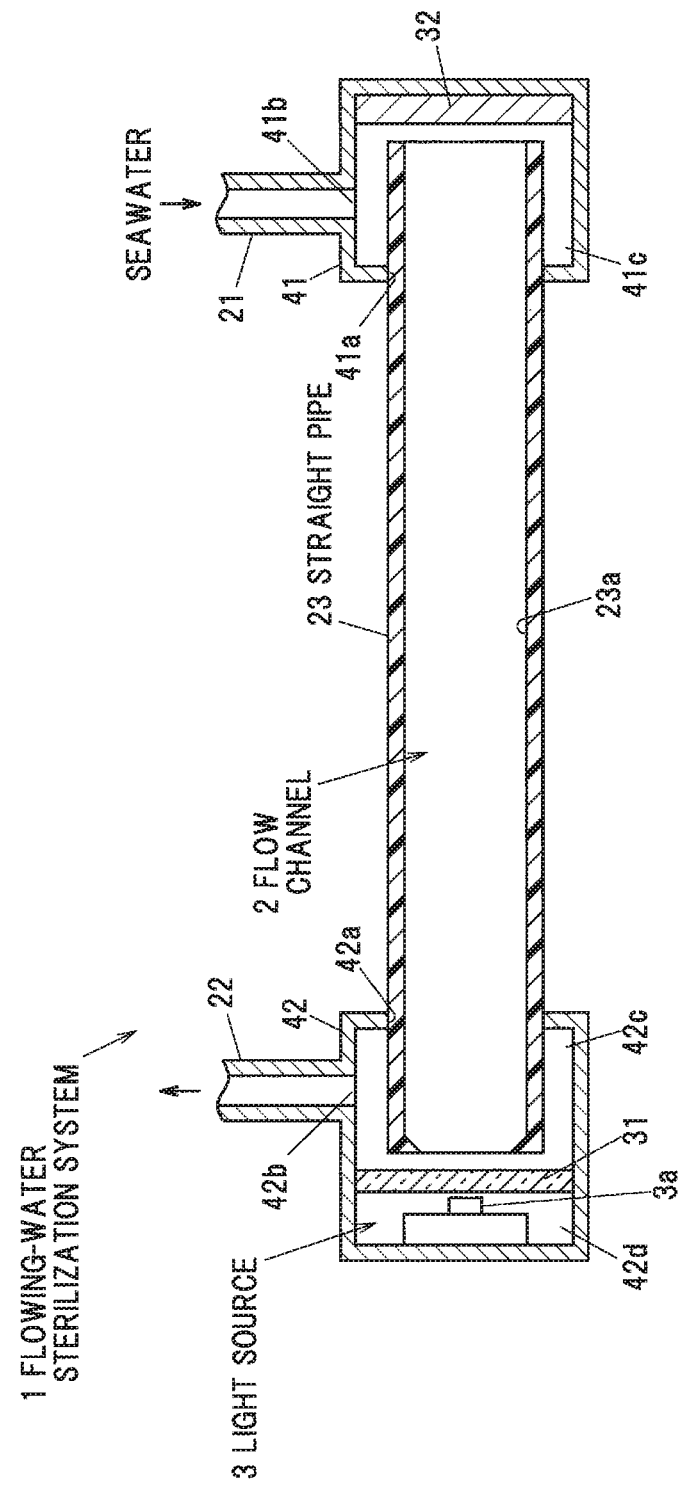

AQUACULTURE SYSTEM

CROSS REFERENCE TO RELATED APPLICATIONS

The present application is based on Japanese Patent Application No. 2017-158860 filed on Aug. 21, 2017, the entire contents of which are incorporated herein by reference.

TECHNICAL FIELD

The invention relates to an aquaculture for cultivating oysters, etc.

BACKGROUND ART

Conventionally, systems for cultivating shellfish or fish in water tank (pool) with introduced seawater are known. In case of, e.g., oyster farming, there is generally a pool immersion process in which oysters are immersed in water tank for a predetermined period of time. The pool immersion process serves to remove odor by causing oysters to expel bodily waste called pseudofeces and also serves to enhance safety by causing the oysters to excrete virus such as norovirus.

Japanese Patent Application Publication No. 2014/18099 is the prior art related to the invention of the present application.

CITATION LIST

Patent Literatures

JP 2014/18099

SUMMARY OF INVENTION

Technical Problem

To improve taste by sufficiently removing odor of oyster in the pool immersion process, it is necessary to cause oysters to expel as much pseudofeces as possible and to efficiently get rid of the expelled pseudofeces from the water tank. It is also desired to increase the respiratory rate of oysters to increase efficiency of virus excretion in the pool immersion process.

Therefore, it is an object of the invention to provide an aquaculture system which can improve taste and safety.

Solution to Problem

An embodiment of the invention provides an aquaculture system, comprising:
 a water tank holding seawater and housing shellfish or fish to be cultivated;
 a water intake unit for introducing the seawater into the water tank;
 a draining unit for draining the seawater in the water tank;
 a first bubble generator that generates and supplies microbubbles with a diameter of not less than 10 μm and not more than 100 μm in the water tank; and
 a second bubble generator that generates and supplies nanobubbles with a diameter of not more than 10 μm in the water tank,
 wherein the seawater in the water tank is exchanged by simultaneously carrying out introduction of the seawater using the water intake unit and drainage of the seawater in the water tank using the draining unit.

Advantageous Effects of Invention

According to an embodiment of the invention, an aquaculture system can be provided which can improve taste and safety.

BRIEF DESCRIPTION OF DRAWINGS

FIG. 2 is a cross sectional view showing a flowing-water sterilization system.

DESCRIPTION OF EMBODIMENTS

An embodiment of the invention will be described below in conjunction with the appended drawings.

Figure 1:
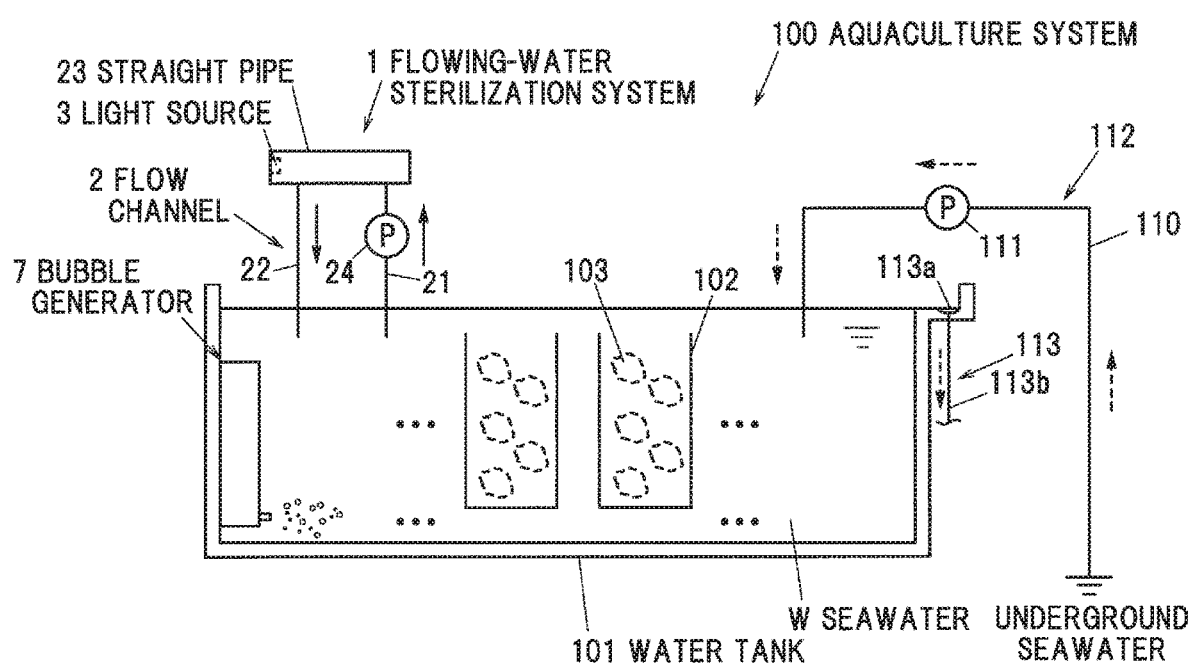
FIG. 1 is a schematic configuration diagram illustrating an aquaculture system in an embodiment of the present invention.

FIG. 1 is a schematic configuration diagram illustrating an aquaculture system in the present embodiment. As shown in FIG. 1, an aquaculture system 100 is provided with a water tank 101 holding seawater W and housing shellfish or fish to be cultivated, a water intake unit 112 for introducing the seawater W into the water tank 101, and a draining unit 113 for draining the seawater in the water tank 101.

In the water tank 101, the seawater W is held and shellfish or fish to be cultivated are housed. In the present embodiment, the aquaculture system 100 used to cultivate oysters 103 will be described. Plural oyster cages 102 housing the oysters 103 are immersed in the seawater W held in the water tank 101.

The water intake unit 112 has a water intake channel 110 for drawing underground seawater into the water tank, and a water intake pump 111 provided on the water intake channel 110 to pump up the underground seawater.

The draining unit 113 is configured to drain the seawater W exceeded a predetermined water level in the water tank 101. In other words, the draining unit 113 serves as an overflow for the seawater W and thereby drains the seawater W. The draining unit 113 has a drain outlet 113a provided at a predetermined height from the bottom surface of the water tank 101, and a drainage channel 113b connected to the drain outlet 113a.

The aquaculture system 100 is used for the pool immersion process in which the oysters 103 are immersed in the seawater W in the water tank 101 for a predetermined period of time. The pool immersion process serves to remove odor by causing the oysters 103 to expel bodily waste called pseudofeces and also serves to enhance safety by causing the oysters 103 to excrete virus such as norovirus.

To remove the pseudofeces or virus expelled or excreted by the oysters 103, the aquaculture system 100 exchanges the seawater W in the water tank 101 by simultaneously carrying out introduction of seawater (underground seawater in this example) using the water intake unit 112 and drainage (overflow) of the seawater W in the water tank 101 using the draining unit 113.

(Bubble Generator)

The aquaculture system 100 is provided with a first bubble generator which generates and supplies microbubbles with a diameter of not less than 10 μm and not more than 100 μm in the water tank 101, and a second bubble generator which generates and supplies nanobubbles with a diameter of not more than 10 μm in the water tank 101. Although a bubble generator 7 which generates both microbubbles and nanobubbles (i.e., which serves as the first bubble generator as well as the second bubble generator) is used in the present embodiment, the first bubble generator generating microbubbles and the second bubble generator generating nanobubbles may be separately provided.

The diameter of bubbles can be measured by an image processing technique in which a captured image of bubble is processed and the diameter is calculated, a measurement method based on intensity of scattered light (light scattering particle counter method, laser diffraction/scattering method), a measurement method using interference of scattered light (phase Doppler technique, interferometric imaging technique), or a measurement method based on Brownian motion (Brownian motion tracking method, dynamic light scattering technique), etc. Although bubbles with a diameter of about 10 μm to several hundred nm are sometimes called micro-nano bubble, nanobubble in the embodiment is defined to include micro-nano bubble.

Microbubbles having a relatively large diameter have a high rising speed and serve to catch pseudofeces in the water tank 101 and carry the pseudofeces out of the water tank 101 with overflow of the seawater W.

Nanobubbles having a relatively small diameter have a lower rising speed than microbubbles and stay in the water tank 101 for a relatively long time, and thus serve to allow the oysters 103 to efficiently take in oxygen. Since this increases the respiratory rate of the oysters 103, it is possible to encourage the oysters 103 to expel pseudofeces or excrete virus.

Thus, by using microbubbles and nanobubbles together, it is possible to efficiently cause the oysters 103 to expel pseudofeces or excrete virus and also to efficiently discharge the expelled pseudofeces or excreted virus, together with the seawater W, from the water tank 101.

The volume of microbubbles and nanobubbles is not specifically limited, but is appropriately determined by taking into consideration, e.g., the size of the water tank 101, the number of the housed oysters 103, and the flow rate of underground seawater introduced into the water tank 101. In addition, the volume of nanobubbles is desirably not less than 30% and not more than 300% of the volume of microbubbles since a sufficient effect is not expected when one of microbubbles and nanobubbles is present in a small amount.

Hereinafter, microbubbles and nanobubbles are collectively called "bubbles". To increase the effect of supplying bubbles, the bubble generator 7 desirably supplies bubbles from the bottom of the water tank 101.

As the bubble generator 7, it is possible to use, e.g., a bubble generator using ultrasonic, swirling flow, pressurized dissolution or microporous. In this example, a swirling flow bubble generator is used as the bubble generator 7.

(Flowing-Water Sterilization System)

The aquaculture system 100 is further provided with a flowing-water sterilization system 1. The flowing-water sterilization system 1 is used to further enhance safety by sterilizing the seawater W in the water tank 101 which potentially contains virus excreted by the oysters 103.

In the present embodiment, since the respiratory rate of the oysters 103 is increased by nanobubbles so that virus is easily excreted, it is possible to further increase the virus eradication effect by combining the flowing-water sterilization system 1.

FIG. 2 is a cross sectional view showing the flowing-water sterilization system 1. The flowing-water sterilization system 1 is mounted on, e.g., a rack which is provided near the water tank 101. The flowing-water sterilization system 1 is provided with a flow channel 2 for passing seawater so that the seawater W taken in from the water tank 101 is discharged back to the water tank 101, and a light source 3 emitting ultraviolet light to irradiate the seawater W passing through the flow channel 2.

The flow channel 2 has an inlet pipe 21 for taking in the seawater W, an outlet pipe 22 for discharging the seawater W, and a straight pipe 23 which extends linearly and is in communication with the inlet pipe 21 and the outlet pipe 22. An end of the inlet pipe 21 on the opposite side to the straight pipe 23 is immersed in the seawater W in the water tank 101, and the seawater W in the water tank 101 is sucked up through this end. The seawater W discharged from an end of the outlet pipe 22 on the opposite side to the straight pipe 23 is returned to the water tank 101. The flow rate of the seawater W passing through the flow channel 2 is not specifically limited, but is, e.g., about the same as the flow rate of underground seawater introduced by the water intake unit 112.

Both ends of the straight pipe 23 are respectively inserted into a first case 41 and a second case 42. Hereinafter, an axial direction of the straight pipe 23 is simply referred to as "the axial direction". The first case 41 and the second case 42 are formed in a substantially rectangular parallelepiped shape and also serve to fix the flowing-water sterilization system 1 in a predetermined installation position, such as on the rack.

The first case 41 has a first straight-pipe insertion hole 41a which opens on one side in the axial direction and into which an end portion of the straight pipe 23 is inserted, a first connection hole 41b which opens in a direction perpendicular to the axial direction and is connected to the inlet pipe 21, and a first flow regulating chamber 41c in communication with the first straight-pipe insertion hole 41a and the first connection hole 41b. The straight pipe 23 is arranged so that one end thereof protrudes inside the first flow regulating chamber 41c.

The second case 42 has a second straight-pipe insertion hole 42a which opens on the other side in the axial direction and into which the other end portion of the straight pipe 23 is inserted, a second connection hole 42b which opens in a direction perpendicular to the axial direction and is connected to the outlet pipe 22, and a second flow regulating chamber 42c in communication with the second straight-pipe insertion hole 42a and the second connection hole 42b. The straight pipe 23 is arranged so that the other end thereof protrudes inside the second flow regulating chamber 42c.

The extending direction of the straight-pipe insertion holes 41a and 42a and the extending direction of the connection holes 41b and 42b are orthogonal to each other. In other words, the extending direction of the straight pipe 23 inserted into the straight-pipe insertion holes 41a and 42a and the extending direction of the inlet pipe 21 and the outlet pipe 22 inserted into the connection holes 41b and 42b are orthogonal to each other. In the present embodiment, the inlet pipe 21 and the outlet pipe 22 extend vertically downward (in FIG. 2, toward the upper side). The first case 41 and the inlet pipe 21, and the second case 42 and the outlet pipe 22, are integrated in FIG. 2 but may be separate components. Alternatively, the inlet pipe 21 and the outlet pipe 22 may be partially integrated with the cases 41 and 42.

The inlet pipe 21 is configured that the seawater W is taken in from one end and the other end is connected to the first connection hole 41b of the first case 41. That is, the other end of the inlet pipe 21 is in communication with the one end of the straight pipe 23 via the first case 41. The seawater W taken in from the inlet pipe 21 passes through the first flow regulating chamber 41c and is introduced into the straight pipe 23.

The outlet pipe 22 is configured that one end is connected to the second connection hole 42b of the second case 42 and the seawater W is discharged from the other end into the water tank 101. The one end of the outlet pipe 22 is in communication with the other end of the straight pipe 23 via the second case 42. The seawater W after passing through the straight pipe 23 is introduced into the outlet pipe 22 via the second flow regulating chamber 42c and is discharged into a water tank, etc., from the other end of the outlet pipe 22. A pump 24 for drawing/discharging the seawater W is provided on the inlet pipe 21.

The straight pipe 23 used here is formed such that at least an inner surface 23a thereof is formed of a material which reflects ultraviolet light emitted from the light source 3. The material which reflects ultraviolet light emitted from the light source 3 is, e.g., polytetrafluoroethylene (PTFE) which is highly reflective to ultraviolet light and excellent in durability, heat resistance and chemical resistance. The straight pipe 23 formed of PTFE and having an inner diameter of about 40 mm is used in the present embodiment.

In the second case 42, a window member 31 is provided so that the second flow regulating chamber 42c is divided in the axial direction. A divided space formed by providing the window member 31 is referred to as a light-source housing space 42d. The light source 3 is provided in the light-source housing space 42d so as to face the downstream end portion of the straight pipe 23 via the window member 31. In other words, in the flowing-water sterilization system 1, the light source 3 is provided downstream of the straight pipe 23 (on the outlet pipe 22 side) and emits ultraviolet light in the axial direction of the straight pipe 23. The window member 31 is highly transmissive to ultraviolet light and can be formed of, e.g., quartz glass ($SiO_2$), sapphire glass ($Al_2O_3$) or an amorphous fluorine-based resin, etc. A circuit board mounting the light source 3 is also housed in the light-source housing space 42d, even though it is not shown in the drawing.

A connector portion is provided on the second case 42 and a cable extending from an external power-supply unit is electrically connected to the circuit board via the connector portion, even though it is not shown in FIG. 1. The second case 42 is desirably further provided with a cooling unit for cooling the light source 3. As the cooling unit, it is possible to use a cooling device of water-cooling type configured to use the seawater W, etc., as a coolant water, or a cooling device of air-cooling type having a fan, etc.

Meanwhile, in the first case 41, a plate-shaped reflector 32 which reflects ultraviolet light is provided along an inner wall of the first flow regulating chamber 41c which faces the upstream end portion of the straight pipe 23. In other words, in the present embodiment, the reflector 32 is provided upstream of the straight pipe 23 (on the inlet pipe 21 side) so as to face the light source 3. Ultraviolet light emitted from the light source 3 and propagated inside the straight pipe 23 is reflected at the reflector 32 toward the downstream side and UV irradiation efficiency is thereby enhanced. The reflector 32 may have a flat reflective surface or a curved reflective surface such as concave surface. As the reflector 32, it is possible to use a reflector formed by depositing aluminum on an aluminum base and further depositing an oxide film layer.

In the flowing-water sterilization system 1, ultraviolet light emitted from the light source 3 is transmitted through the window member 31 and propagates in the axial direction of the straight pipe 23 while being reflected by the inner surface 23a of the straight pipe 23. The ultraviolet light which passed through the straight pipe 23 is reflected by the reflector 32 and propagates inside the straight pipe 23 in the axial direction again. In the flowing-water sterilization system 1, the seawater W passing through the straight pipe 23 is sterilized by the ultraviolet light propagating inside the straight pipe 23 in the axial direction.

In the present embodiment, light-emitting diodes 3a which emit ultraviolet light are used as the light source 3. Although nineteen light-emitting diodes 3a are used to constitute the light source 3 in this example, the number of the light-emitting diodes 3a used as the light source 3 is not limited thereto. In FIG. 2, only one light-emitting diode 3a is shown to simplify the drawing. A driver circuit of the light-emitting diode 3a is provided external to the second case 42. In the present embodiment, the driver circuit is mounted inside the external power-supply unit.

A light distribution angle of the light source 3 is preferably not more than 30°. In this case, an incident angle of ultraviolet light on the inner surface 23a of the straight pipe 23 is not less than 75°, which increases reflection at the inner surface 23a of the straight pipe 23 and thereby increases efficiency of irradiating the seawater W. The light source 3 may include a member for adjusting the distribution angle of light emitted from the light-emitting diode 3a, such as a concave mirror.

The light-emitting diode 3a used for the light source 3 preferably emits ultraviolet light with a wavelength of not less than 250 nm and not more than 350 nm. In other words, the light-emitting diode 3a used here desirably has a center wavelength or peak wavelength in a range of not less than 250 nm and not more than 350 nm. To further increase the sterilizing effect, it is preferable to use the light-emitting diode 3a emitting ultraviolet light with a wavelength of not less than 255 nm and not more than 285 nm which is highly effective for sterilization. Meanwhile, to prevent occurrence of fouling on the window member 31 or the inner surface 23a of the straight pipe 23, it is preferable to use the light-emitting diode 3a emitting light not containing infrared light or light with a wavelength of not more than 200 nm which has high oxidation power.

Figure 3A:
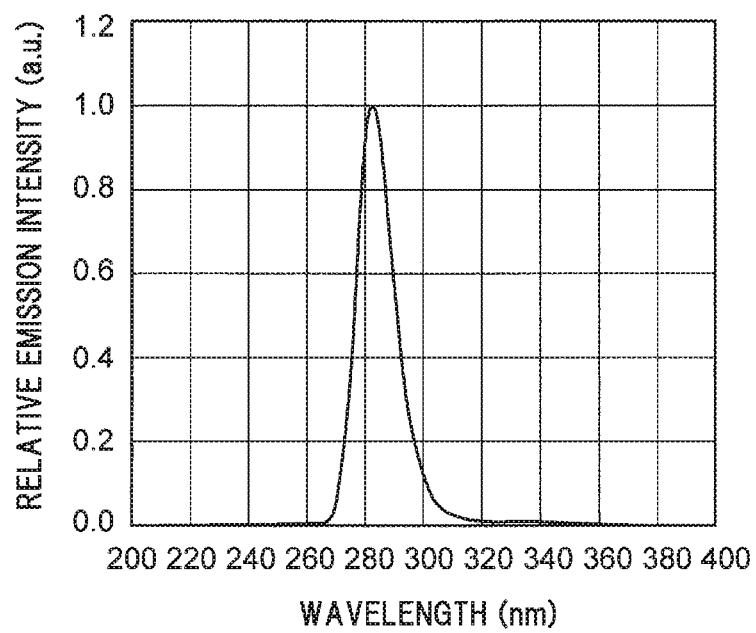
FIG. 3A is a graph showing spectral distribution of a light-emitting diode used for a light source.
Figure 3B:
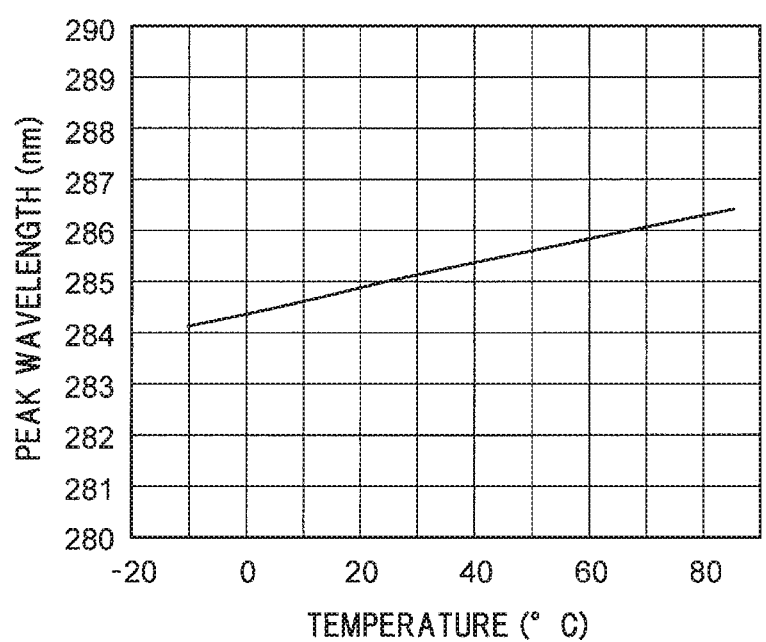
FIG. 3B is a graph showing a relation between temperature and emission wavelength of the light-emitting diode.

FIG. 3A is a graph showing spectral distribution of the light-emitting diode 3a used as the light source 3 in the present embodiment and FIG. 3B is a graph showing a relation between temperature and emission wavelength of the light-emitting diode 3a. FIG. 3A shows spectral distribution in a 25 degrees Celsius environment.

As shown in FIGS. 3A and 3B, the light-emitting diode 3a which is used as the light source 3 in the present embodiment has a peak wavelength of 285 nm in a 25 degrees Celsius environment. In addition, the light-emitting diode 3a emits light not containing infrared light or light with a wavelength of not more than 200 nm. A light-emitting diode of which light-emitting layer (active layer) is formed of aluminum gallium nitride (AlGaN) is used as the light-emitting diode 3a.

The seawater W passing through the flow channel 2 desirably contains nanobubbles. In other words, an air outlet of the bubble generator 7 is desirably provided at a position where nanobubbles are sucked, together with the seawater W, into the inlet pipe 21. The seawater W passing through the flow channel 2 may also contain microbubbles.

Thus, in the flowing-water sterilization system 1, the seawater W containing nanobubbles is exposed to ultraviolet light. Transmittance of ultraviolet light is higher through air than through water. Therefore, by passing the seawater W containing nanobubbles through the flow channel 2, transmittance of ultraviolet light travelling in the axial direction is increased. In addition, since ultraviolet light is scattered, reflected or refracted by nanobubbles, irradiance distribution of ultraviolet light inside the straight pipe 23 becomes uniform. Therefore, it is possible to prevent partial lack of exposure to ultraviolet light and thus prevent the insufficiently sterilized seawater W from partially passing through. In other words, the sterilizing effect is improved by using the flowing-water sterilization system 1 and the bubble generator 7 together.

(Effects of the Embodiment)

As described above, the aquaculture system 100 in the present embodiment is provided with the first bubble generator (the bubble generator 7 in this example) which generates and supplies microbubbles with a diameter of not less than 10 μm and not more than 100 μm in the water tank 101, and a second bubble generator (also the bubble generator 7 in this example) which generates and supplies nanobubbles with a diameter of not more than 10 μm in the water tank 101.

Thus, it is possible to efficiently cause the oysters 103 to expel pseudofeces or excrete virus by increasing the respiratory rate using nanobubbles which stay in water for longer time, and also possible to efficiently discharge the expelled pseudofeces or excreted virus, together with the seawater W, by microbubbles having a high rising speed. As a result, it is possible to remove odor by causing the oysters to sufficiently expel pseudofeces and also to enhance safety by causing the oysters to excrete virus.

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] An aquaculture system (100), comprising: a water tank (100) holding seawater (W) and housing shellfish or fish to be cultivated; a water intake unit (112) for introducing the seawater into the water tank (101); a draining unit (113) for draining the seawater (W) in the water tank (101); a first bubble generator (7) that generates and supplies microbubbles with a diameter of not less than 10 μm and not more than 100 μm in the water tank (101); and a second bubble generator (7) that generates and supplies nanobubbles with a diameter of not more than 10 μm in the water tank (101), wherein the seawater (W) in the water tank (101) is exchanged by simultaneously carrying out introduction of the seawater using the water intake unit (112) and drainage of the seawater (W) in the water tank (101) using the draining unit (113).

[2] The aquaculture system (100) described in [1], wherein the first and second bubble generators (7) supply air bubbles from the bottom of the water tank (101).

[3] The aquaculture system (100) described in [1] or [2], wherein the draining unit (113) is configured to drain the seawater (W) exceeded a predetermined water level in the water tank (101).

[4] The aquaculture system (100) described in any one of [1] to [3], further comprising: a flowing-water sterilization system (1) that comprises a flow channel (2) for passing seawater so that the seawater (W) taken in from the water tank (101) is discharged back to the water tank (101), and a light source (3) emitting ultraviolet light to irradiate the seawater (W) passing through the flow channel (2).

[5] The aquaculture system (100) described in [4], wherein the seawater (W) passing through the flow channel (2) contains nanobubbles.

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof. For example, although the light source 3 in the flowing-water sterilization system 1 is provided at the downstream end portion of the straight pipe 23 in the embodiment, the light source 3 may be provided at the upstream end portion of the straight pipe 23, or the light sources 3 may be provided at both the upstream and downstream end portions of the straight pipe 23.

In addition, although only one flowing-water sterilization system 1 and only one bubble generator 7 are provided in the embodiment, plural bubble generators 7 and flowing-water sterilization systems 1 may be provided for one water tank 101.

REFERENCE SIGNS LIST

1 FLOWING-WATER STERILIZATION SYSTEM
2 FLOW CHANNEL
21 INLET PIPE
22 OUTLET PIPE
23 STRAIGHT PIPE
3 LIGHT SOURCE
3a LIGHT-EMITTING DIODE
31 WINDOW MEMBER
32 REFLECTOR
7 BUBBLE GENERATOR
100 AQUACULTURE SYSTEM
101 WATER TANK
112 WATER INTAKE UNIT
113 DRAINING UNIT
W SEAWATER

The invention claimed is:

1. An aquaculture system, comprising:
a water tank holding seawater and housing shellfish or fish to be cultivated;
a water intake unit for introducing the seawater into the water tank;
a draining unit for draining the seawater in the water tank;
a first bubble generator that generates and supplies microbubbles with a diameter of not less than 10 μm and not more than 100 μm in the water tank; and
a second bubble generator that generates and supplies nanobubbles with a diameter of not more than 10 μm in the water tank,
wherein the seawater in the water tank is exchanged by simultaneously carrying out introduction of the seawater using the water intake unit and drainage of the seawater in the water tank using the draining unit.

2. The aquaculture system according to claim 1, wherein the first and second bubble generators supply air bubbles from the bottom of the water tank.

3. The aquaculture system according to claim 1, wherein the draining unit is configured to drain the seawater exceeded a predetermined water level in the water tank.

4. The aquaculture system according to claim 1, further comprising
a flowing-water sterilization system that comprises a flow channel for passing seawater so that seawater taken from the water tank is discharged back to the water tank, and a light source emitting ultraviolet light to irradiate the seawater passing through the flow channel.

5. The aquaculture system according to claim 4, wherein the seawater passing through the flow channel contains nanobubbles.

6. The aquaculture system according to claim 2, wherein the draining unit is configured to drain the seawater exceeded a predetermined water level in the water tank.

7. The aquaculture system according to claim 2, further comprising
a flowing-water sterilization system that comprises a flow channel for passing seawater so that seawater taken from the water tank is discharged back to the water tank, and a light source emitting ultraviolet light to irradiate the seawater passing through the flow channel.

8. The aquaculture system according to claim 3, further comprising
a flowing-water sterilization system that comprises a flow channel for passing seawater so that seawater taken from the water tank is discharged back to the water tank, and a light source emitting ultraviolet light to irradiate the seawater passing through the flow channel.

9. The aquaculture system according to claim 6, further comprising
a flowing-water sterilization system that comprises a flow channel for passing seawater so that seawater taken from the water tank is discharged back to the water tank, and a light source emitting ultraviolet light to irradiate the seawater passing through the flow channel.

* * * * *